United States Patent [19]
Rubner

[11] Patent Number: 5,980,189
[45] Date of Patent: Nov. 9, 1999

[54] PORTABLE GRAIN CART

[75] Inventor: Daryl Rubner, Oelwein, Iowa

[73] Assignee: United Farm Tools, Oelwein, Iowa

[21] Appl. No.: 09/023,774

[22] Filed: Feb. 13, 1998

[51] Int. Cl.⁶ ........................................... B60P 1/36
[52] U.S. Cl. .................. 414/505; 198/550.13; 414/523; 414/528
[58] Field of Search .................. 414/523, 528, 414/502–505, 327; 198/550.8, 550.9, 550.12, 550.13

[56] References Cited

U.S. PATENT DOCUMENTS

| | | | |
|---|---|---|---|
| 2,296,014 | 9/1942 | Benzel, Sr. et al. | 414/505 |
| 2,481,860 | 9/1949 | Miller | 414/526 X |
| 2,761,578 | 9/1956 | Brownlee et al. | 414/503 X |
| 2,772,767 | 12/1956 | Seifert | 414/523 X |
| 3,021,025 | 2/1962 | Sudenga et al. | 414/505 |
| 3,265,253 | 8/1966 | Niewold | 414/523 X |
| 3,273,734 | 9/1966 | Schuler | 414/504 |
| 3,337,068 | 8/1967 | Meharry | 414/523 |
| 3,477,599 | 11/1969 | De Coene | 414/502 |
| 3,512,669 | 5/1970 | Benedict et al. | 414/504 |
| 3,561,681 | 2/1971 | Tyler | 414/523 X |
| 3,575,306 | 4/1971 | Obermeyer et al. | 414/523 |
| 3,638,816 | 2/1972 | Mann | 414/504 |
| 3,642,155 | 2/1972 | Carlson | 414/523 |
| 3,664,525 | 5/1972 | Herbsthofer | 414/326 |
| 3,882,994 | 5/1975 | Mecks et al. | 198/550.12 X |
| 4,092,004 | 5/1978 | Leverenz et al. | 241/56 |
| 4,095,705 | 6/1978 | Hood | 414/519 |
| 4,274,790 | 6/1981 | Barker | 414/502 |
| 4,415,303 | 11/1983 | Westendorf et al. | 414/523 X |
| 4,427,105 | 1/1984 | Hawley et al. | 414/523 |
| 4,646,942 | 3/1987 | Kuhns | 222/144.5 |
| 4,662,812 | 5/1987 | Busboom et al. | 414/523 |
| 4,669,945 | 6/1987 | Pollard et al. | 414/505 |
| 4,846,621 | 7/1989 | Warsaw | 414/526 |
| 4,923,358 | 5/1990 | Van Mill | 414/519 |
| 5,013,208 | 5/1991 | Grieshop | 414/526 |
| 5,100,281 | 3/1992 | Grieshop | 414/526 |
| 5,409,344 | 4/1995 | Tharoldsor | 414/523 X |
| 5,718,556 | 2/1998 | Forsyth | 414/523 X |

FOREIGN PATENT DOCUMENTS

| | | | |
|---|---|---|---|
| 471467 | 3/1973 | Australia | 414/502 |
| 2141520 | 8/1971 | Germany . | |
| 2412816 | 9/1975 | Germany . | |
| 1167113 | 3/1968 | United Kingdom . | |

OTHER PUBLICATIONS

A&L Grain Carts, Parham Industries, Inc. Brochure.
280 Bushel Grain Buggy, United Farm Tools, Inc. Brochure.
Model 475 Grain Cart, Kill Brothers Co. Brochure.
New Product Information, Versatile Grain Carts, Unverferth Mfg. Co. Brochure.
Model 456 A&L Grain Carts, Parham Industries, Inc. Brochure.
Model 1200 and Model 1600 Grain Carts, Kill Brothers Co. Brochure.
40 Series Auger Wagons, Kinze Manufacturing Inc.
444 Grain Buggy, United Farm Tools, Inc. Brochure.
Brent Grain Carts, Unverferth Mfg. Co. Brochure.
The New Generation of Brent Grain Carts from Unverferth, Unverferth Mfg. Co. Brochure.

*Primary Examiner*—David A. Bucci
*Attorney, Agent, or Firm*—James C. Nemmers

[57] ABSTRACT

A portable grain cart that has independently operated, endless, rubber belted conveyors for moving material out of the hopper and then discharging the material into a truck or other transport or storage facility. A first rubber belted conveyor is mounted inside of the hopper to pick up the material from the hopper and then discharge the material outside the cart onto a second conveyor which then moves the material into the truck. The outside or discharge conveyor is pivotally mounted so that it can be swung to a number of positions, including a storage position, and it also can be elevated to different heights depending upon the truck or storage facility into which the material is to be discharged.

4 Claims, 2 Drawing Sheets

PORTABLE GRAIN CART

BACKGROUND OF THE INVENTION

The invention relates to a grain cart having an improved conveyor system for moving grain from the cart and discharging it to a desired location.

Portable grain carts are commonly used during the harvesting of grain to temporarily store the grain during the harvest. The portable cart is usually towed by a tractor alongside the combine to receive the grain as it is harvested. The cart is then towed to a truck where the grain is discharged from the cart into the truck for transport to a storage facility such as a grain bin, grain elevator, etc. The use of grain carts therefore can greatly improve the efficiency of the harvest.

There are numerous manufacturers of grain carts of varying designs. As is well known to those skilled in the art, the grain cart typically includes an auger conveyor usually mounted with its inlet end inside the hopper and then extending toward the front or left front corner of the grain cart. The auger conveyor moves the grain from the bottom of the grain cart hopper upwardly and outwardly where grain can be discharged into a truck for transport. Because the auger must extend outwardly from the hopper of the grain cart a sufficient distance and height to enable efficient unloading, the auger is usually made in two sections. A lower section is mounted inside or on the side of the hopper to move the grain out of the bottom of the hopper, and an upper section is mounted outside the hopper and connected to the lower section to carry the grain to a sufficient height for discharge into a truck or other storage or transport facility. Because it is undesirable during storage or transport of the grain cart for the auger to extend outwardly from the cart, the upper section is usually mounted so that it can be swung out of the way alongside the grain cart. The necessity of providing for movement of the upper part of the auger between a transport position and a operating position requires that a suitable connection be provided between the upper and lower sections. The design of this connection creates problems of how to drive the two auger sections and seal the joint between them. Typical grain carts having various auger arrangements are shown in Grieshop U.S. Pat. No. 5,013,208, Warsaw U.S. Pat. No. 4,846,621 and Barker U.S. Pat. No. 4,274,790. With the auger systems of the grain carts illustrated by these prior art patents, the grain can be distributed as it is discharged by the auger only by moving the cart since the upper auger section is fixed to the lower auger section once they are locked in place in the operating position. Tharaldson U.S. Pat. No. 5,409,344 shows a portable grain cart which has two independently operable augers, each driven by a hydraulic motor. This arrangement permits the upper or discharge auger to be swung through a wide arc during discharge of the grain thereby allowing discharge of the grain to be spread without moving the cart itself.

Regardless of the particular arrangement of the system for removing the grain from the cart and discharging it into a truck or storage facility, the known prior art systems employ an auger in two sections or use two independent augers. Although these prior art carts are extensively used in grain harvest, they are not suitable for all types of crops and other material, and occasionally, the material being handled can be damaged by the auger resulting in losses to the farmer. There is therefore a need for an improved discharge system that is capable of handling almost all crops and other materials without the fear of damage to the material. Any such improved discharge system for grain carts must also be such that it has all of the advantages of the prior art system without the disadvantages, including ease of use and maintenance.

SUMMARY OF THE INVENTION

The portable grain cart of the invention provides independently operated, endless, rubber belted conveyors for moving material out of the hopper and then discharging the material into a truck or other transport or storage facility. A rubber belted conveyor is mounted inside of the hopper to pick up the material from the hopper and then discharge the material outside the cart onto a second conveyor which then moves the material into the truck. The outside or discharge conveyor is pivotally mounted so that it can be swung to a number of positions, including a storage position, and it also can be elevated to different heights depending upon the truck or storage facility into which the material is to be discharged. The conveyors are independently driven by hydraulic motors and moved to different positions by hydraulic cylinders.

DESCRIPTION OF THE PREFERRED EMBODIMENT OF THE INVENTION

Figure 1:
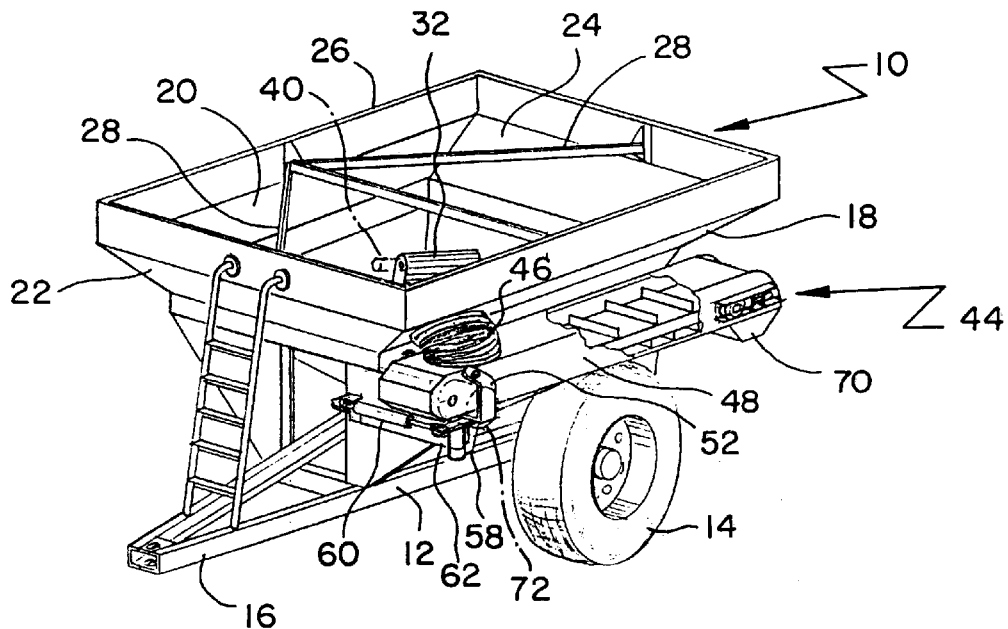
FIG. 1 is a perspective view of a grain cart constructed according to the principles of the invention and showing the discharge conveyor in transport position.

The drawings illustrate a grain cart having a hopper 10 mounted on a supporting frame 12 supported by ground engaging wheels 14. A tow bar 16 provides for attachment in any suitable manner to a towing vehicle (not shown).

The hopper 10 includes downwardly and inwardly sloping side walls 18 and 20 that are joined by the downwardly and inwardly sloping front wall 22 and rear wall 24. All of the walls 18, 20, 22 and 24 are topped with a vertically extending top edge 26. One or more structural braces 28 may be provided to reinforce and stabilize the hopper 10. The side walls 18 and 20 and front wall 22 and rear wall 24 form at their lowest juncture a well 30 into which the grain or other material in the hopper 10 will flow by gravity. The foregoing description is generally typical of grain carts of the type commonly known and used in the agricultural industry. This invention relates to the conveying system for unloading the grain from the hopper 10 and discharging it into a truck or other transport vehicle or storage facility.

Mounted inside of the hopper 10 is a conveyor 32, the lower or inlet end 34 of which is positioned in the well 30. Conveyor 32 is of a commonly known type that has an endless flexible belt, usually of rubber, that passes around cylindrical pulleys 38 at the outer ends of the conveyor 32. The belt has on its outer surface a plurality of spaced apart paddles 37 which aid in lifting the material out of the hopper 10. The conveyor 32 is preferably driven by a hydraulic motor 40 attached directly to the pulley 38 at the discharge end of the conveyor. However, the conveyor 32 can be driven in any suitable manner. As shown in the drawings, the conveyor 32 preferably is mounted so as to extend forwardly toward the left side wall 18 so that the conveyor 32 will discharge material, such as grain, contained in the hopper 10 from the left front corner of the hopper 10. Grain carried by conveyor 32 is discharged through an opening 42 in the left side wall 18 onto the inlet end of a discharge conveyor 44. A flexible boot 46 surrounding opening 42 and attached to the inlet end of conveyor 44 confines and guides the grain being discharged from conveyor 32 onto discharge conveyor 44.

The discharge conveyor 44 is also a standard belt-type conveyor having an endless belt containing a plurality of spaced apart paddles 47 moving between side frames 48 around pulleys 50 mounted between the side frames 48 at the inlet and discharge ends of the conveyor 44. If desired, the top of conveyer 44 may be covered to minimize grain from spilling over the sides. At the inlet end of the conveyor 44 side frames 48 are pivotally mounted by horizontal pivot pins 56 at the upper ends of a pair of L-shaped supporting arms 52, one on each side of the conveyor 44. The lower ends of the supporting arms 52 are in turn mounted by a vertical pivot pin 59 to the mounting structure 58 affixed to the frame 12 at the left front of the hopper 10 for turning movement of the conveyor 44 about a vertical axis.

Figure 2:
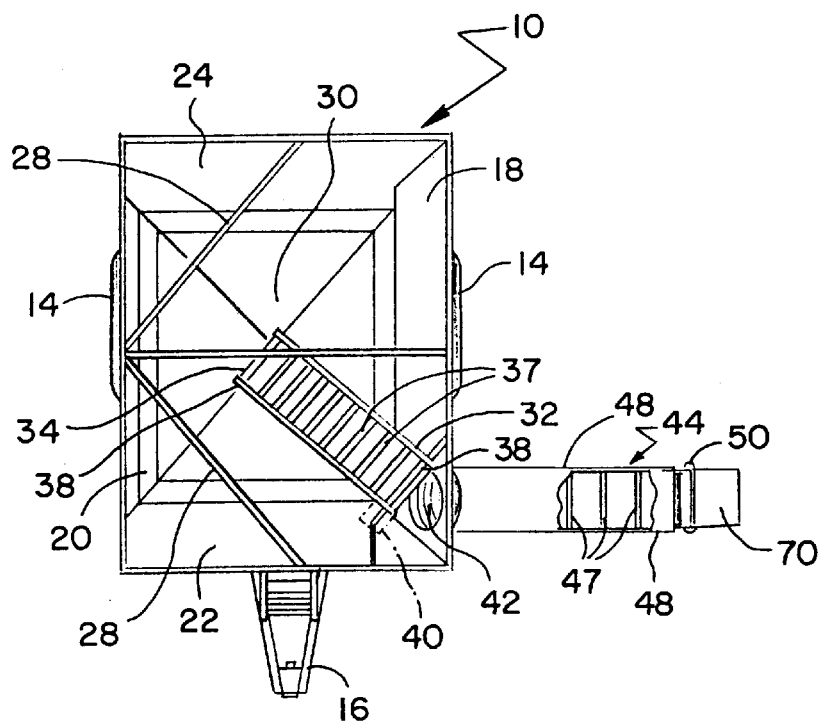
FIG. 2 is a top or plan view of the grain cart of FIG. 1 but showing the discharge conveyor swung outwardly into a discharge position.
Figure 3:
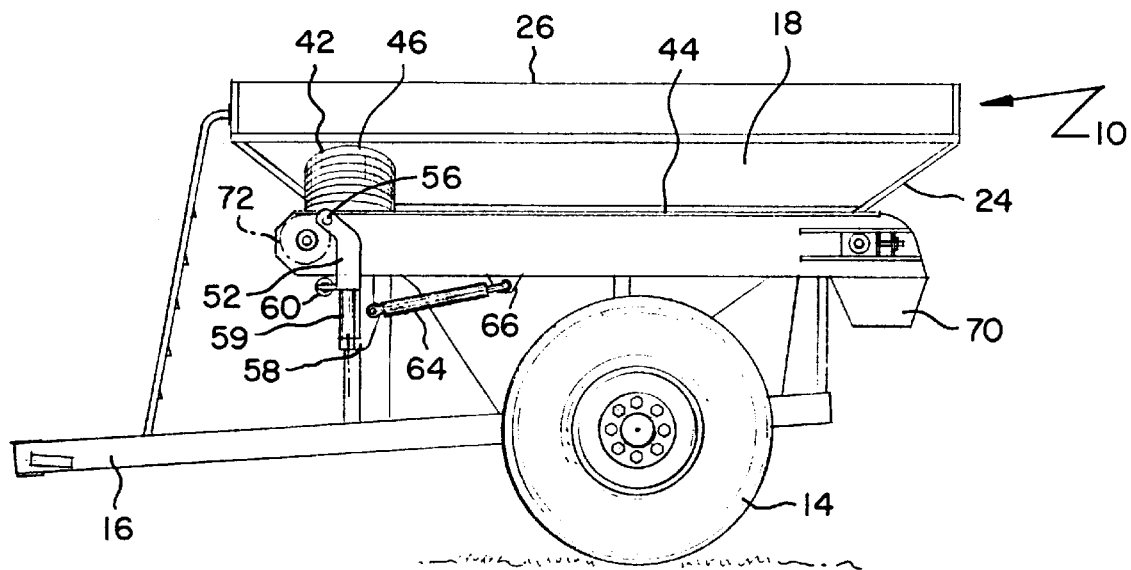
FIG. 3 is a side elevational view of the grain cart showing the discharge conveyor in the transport position.
Figure 4:
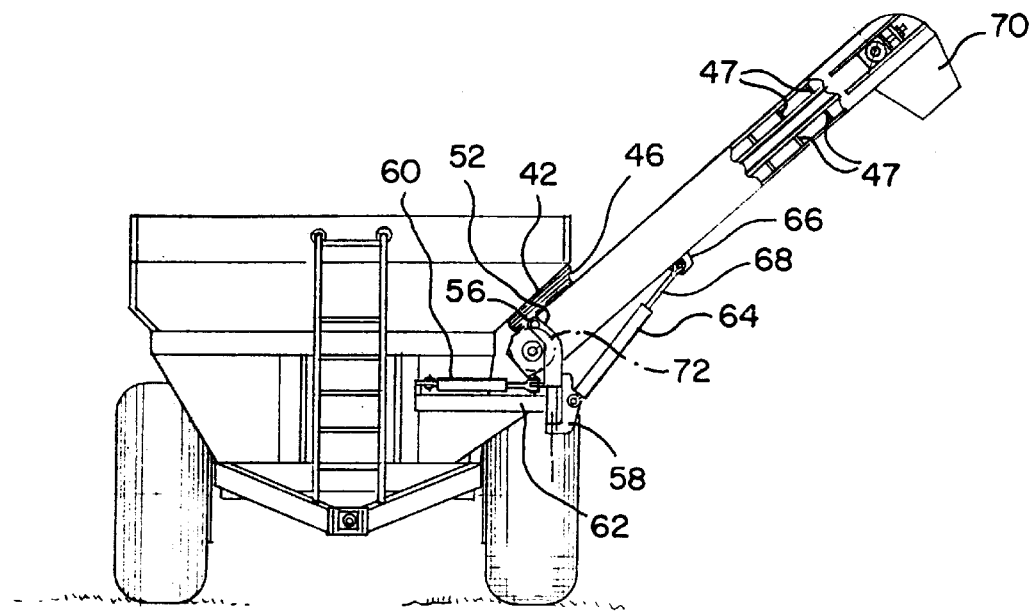
FIG. 4 is an end or front elevational view showing the discharge conveyor in a discharge position.

The lower ends of supporting arms 52 are connected at a point offset from the axis of pivot pin 59 to the operating rod of hydraulic cylinder 60 which is secured to mounting member 62 that forms a part of the supporting frame 12. Thus, when the hydraulic cylinder 60 is actuated, it can swing the discharge conveyor 44 about vertical pivot pin 59 from an outwardly extending position as shown in FIG. 2 to a transport position with the conveyor 44 extending alongside the left side wall 18 as shown in FIG. 1.

Also secured to the mounting structure 58 is a second hydraulic cylinder 64 which has its operating rod 68 pivotally connected in any suitable manner to brackets 66 secured to and extending downwardly from the underside of the side frames 48. When hydraulic cylinder 64 is actuated, the discharge conveyor 44 will therefore be swung upwardly about horizontal pivot pins 56 to move the discharge end of the conveyor 44 to a desired height for convenient loading onto a truck or other grain receiving facility. A boot 70 secured to the outer end of the discharge conveyor 44 confines and guides the grain to minimize losses.

The discharge conveyor 44 is preferably driven by a hydraulic motor 72 mounted at the discharge end of the discharge conveyor 44 near the mounting structure 58.

With the foregoing described structure, the grain or other material contained in hopper 10 is efficiently and easily conveyed by conveyor 32 upwardly out of the hopper 10 where it is discharged through the opening 42. Because of the mounting arrangement for the discharge conveyor 44, the discharge conveyor can be raised with its discharge end to a desired height, and the discharge conveyor 44 can also be swung during operation without moving the cart to distribute the grain being discharged. Moreover, because the discharge conveyor 44 is totally independent from the conveyor 32, the grain can be discharged a selected distance from the cart. By driving the conveyors 32 and 44 independently and hydraulically, complex and high maintenance mechanical drive systems are eliminated. Moreover, there is no mechanical connection between the two conveyors 32 and 44 thus eliminating problems normally associated with the prior art auger system. Movement of the discharge conveyor 44 from one position to another and from the unloading to transport position is quickly and easily accomplished.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A portable grain cart for receiving, transporting and discharging granular materials such as grain into a truck, wagon or other vehicle, said cart comprising: a hopper having sidewalls inwardly sloping toward the bottom of the hopper, the hopper being open at the top and the sidewalls forming a generally rectangular hopper having right and left front corners and right and left rear corners, a first endless belt type conveyor mounted inside of the hopper to pick up the material from the bottom of the hopper and elevate and discharge the material inside the hopper near the left front corner, a second endless belt type conveyor mounted on the cart and having an inlet end and a discharge end with the inlet end adapted to be positioned to receive material discharged from the first conveyor, the discharge end of the second conveyor being adapted to be positioned so as to discharge the material at a selected location outside the cart, a pivotal mounting for the second conveyor to provide for swinging movement of the discharge end of the second conveyor to selected horizontal and vertical positions including a storage position in which the second conveyor is positioned along a sidewall of the hopper, first power means including independently driven hydraulic motors for driving the first and second conveyors, and second power means including hydraulic cylinders for swinging the second conveyor to a selected position.

2. A grain cart according to claim 1 in which the storage position of the second conveyor is along the left side of the cart with the inlet end of the second conveyor near the left front corner.

3. A grain cart according to claim 1 in which the first and second belt type conveyors each have spaced-apart paddles on their belts.

4. A portable grain cart for receiving, transporting and discharging granular materials such as grain into a truck, wagon or other vehicle, said cart comprising: a hopper having sidewalls inwardly sloping toward the bottom of the hopper, the hopper being open at the top and the sidewalls forming a generally rectangular hopper having four upper corners, a first endless belt type conveyor mounted inside of the hopper to pick up the material from the bottom of the hopper and elevate and discharge the material inside the hopper near an upper corner of the hopper, a second endless belt type conveyor mounted on the cart and having an inlet end and a discharge end with the inlet end adapted to be positioned to receive material discharged from the first conveyor, the discharge end of the second conveyor being adapted to be positioned so as to discharge the material at a selected location outside the cart, a pivotal mounting for the second conveyor to provide for swinging movement of the discharge end of the second conveyor to selected horizontal and vertical positions including a storage position in which the second conveyor is positioned along a sidewall of the hopper, first power means including independently driven hydraulic motors for driving the first and second conveyors, and second power means for swinging the second conveyor to a selected position.

\* \* \* \* \*